(12) United States Patent
Bellucco et al.

(10) Patent No.: US 12,111,275 B2
(45) Date of Patent: Oct. 8, 2024

(54) CHECKING METHODS AND SYSTEMS FOR CHECKING A MECHANICAL PIECE MANUFACTURED BY USING A MOLD AND A MANUFACTURING PROCESS IN A FOUNDRY

(71) Applicant: Marposs Societa' Per Azioni, Bentivoglio (IT)

(72) Inventors: Stefano Bellucco, Bologna (IT); Daniele Lanzoni, Cento (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 534 days.

(21) Appl. No.: 17/413,128

(22) PCT Filed: Dec. 17, 2019

(86) PCT No.: PCT/EP2019/085753
§ 371 (c)(1),
(2) Date: Jun. 11, 2021

(87) PCT Pub. No.: WO2020/127347
PCT Pub. Date: Jun. 25, 2020

(65) Prior Publication Data
US 2022/0042940 A1    Feb. 10, 2022

(30) Foreign Application Priority Data

Dec. 18, 2018  (IT) .......................... 102018000020014
Dec. 18, 2018  (IT) .......................... 102018000020017

(51) Int. Cl.
*G01N 25/72*  (2006.01)
*B22D 17/32*  (2006.01)
*B22D 46/00*  (2006.01)

(52) U.S. Cl.
CPC ............. *G01N 25/72* (2013.01); *B22D 17/32* (2013.01); *B22D 46/00* (2013.01)

(58) Field of Classification Search
CPC ......... G01N 25/72; B22D 17/32; B22D 46/00
See application file for complete search history.

(56) References Cited

U.S. PATENT DOCUMENTS

| 4,854,162 | A | * | 8/1989 | Yerace | ................. | G01M 13/04 |
| | | | | | | 374/4 |
| 5,411,074 | A | * | 5/1995 | Naruse | ................. | B22D 17/32 |
| | | | | | | 164/151.4 |

(Continued)

FOREIGN PATENT DOCUMENTS

| CN | 1487874 A | | 4/2004 | | |
| CN | 102323332 A | * | 1/2012 | ............. | G01N 27/90 |

(Continued)

OTHER PUBLICATIONS

U.S. Appl. No. 17/413,128, filed Oct. 27, 2023_WO_2008120774_A1_H.pdf, Oct. 2008.*

(Continued)

*Primary Examiner* — Gail Kaplan Verbitsky
(74) *Attorney, Agent, or Firm* — Blank Rome LLP (57) ABSTRACT

The checking methods includes the steps of feeding molten metal into the mold (3), extracting from the mold after a predetermined cooling time the mechanical piece (2) formed by the solidified molten metal; and acquiring at least one real thermographic image (A, X) of an internal surface (7) of the mold (3). To check the quality of the manufactured mechanical piece, at least part of the real thermographic image and/or related parameters is/are compared with images and/or related parameters belonging to a predetermined acceptability range. A possible anomaly in the mechanical piece is detected if the real thermographic image and/or related parameters do not correspond to said images and/or related (Continued)

parameters belonging to the predetermined acceptability range. A differential thermographic image (C, Z) whose points have values equal to the differences between the values of the points of the real thermographic image and the values of the corresponding points of a reference thermographic image (A, X, B, Y) is determined and used to check at least one part of the manufacturing process.

17 Claims, 8 Drawing Sheets

(56) References Cited

U.S. PATENT DOCUMENTS

| | | | | |
|---|---|---|---|---|
| 5,456,404 | A * | 10/1995 | Robinette, Jr. | G01R 1/06711 228/104 |
| 5,697,424 | A | 12/1997 | Ferdinandsen et al. | |
| 6,592,354 | B2 | 7/2003 | Kachnic et al. | |
| 8,374,438 | B1 * | 2/2013 | Wagner | H04N 5/33 382/209 |
| 2002/0164064 | A1 * | 11/2002 | Karklin | G03F 7/705 382/199 |
| 2012/0186772 | A1 * | 7/2012 | Shaber | B22D 11/055 164/443 |
| 2017/0054923 | A1 * | 2/2017 | Thompson | G01J 5/0096 |
| 2018/0056382 | A1 | 3/2018 | Kress et al. | |

FOREIGN PATENT DOCUMENTS

| | | | | |
|---|---|---|---|---|
| CN | 102621180 | A * | 8/2012 | |
| CN | 102990888 | A | 3/2013 | |
| CN | 204396831 | U | 6/2015 | |
| CN | 105678310 | A * | 6/2016 | G06K 9/00234 |
| CN | 105764632 | A | 7/2016 | |
| CN | 215576310 | U * | 1/2022 | |
| DE | 102004027109 | A1 | 12/2005 | |
| DE | 102006020514 | A1 | 11/2007 | |
| EP | 1870218 | A1 * | 12/2007 | B29C 35/16 |
| EP | 2799598 | A1 * | 11/2014 | B01L 3/04 |
| GB | 2510654 | A * | 8/2014 | F02C 7/14 |
| JP | 60245389 | A * | 12/1985 | |
| JP | S60245389 | A * | 12/1985 | |
| JP | H06143297 | A * | 5/1994 | |
| JP | H08-1302 | A | 1/1996 | |
| JP | H1063340 | A * | 3/1998 | |
| JP | 2000227362 | A * | 8/2000 | |
| JP | 2002321266 | A * | 11/2002 | |
| JP | 2004514573 | A * | 5/2004 | |
| JP | 2004530572 | A * | 10/2004 | |
| JP | 2004325035 | A * | 11/2004 | |
| JP | 2007061854 | A | 3/2007 | |
| JP | 2008249637 | A * | 10/2008 | G01J 1/0455 |
| JP | 2009072798 | A * | 4/2009 | |
| JP | 4401590 | B2 * | 1/2010 | G06K 9/40 |
| JP | 2010023239 | A * | 2/2010 | |
| JP | 2012-110910 | A | 6/2012 | |
| JP | 2013212526 | A | 10/2013 | |
| JP | 2017514592 | A * | 6/2017 | |
| JP | 2018518394 | A * | 7/2018 | |
| JP | 2018-179814 | A | 11/2018 | |
| KR | 20140106257 | A | 9/2014 | |
| WO | WO2008120774 | A * | 10/2008 | |
| WO | WO-2008120774 | A1 * | 10/2008 | G01J 1/0455 |
| WO | WO-2010009901 | A2 * | 1/2010 | A61M 25/10 |

OTHER PUBLICATIONS

U.S. Appl. No. 17/413,128, filed Oct. 26, 2023_JP_2018518394_A_H.pdf, Jul. 2018.*
U.S. Appl. No. 17/413,128, filed Oct. 27, 2023_JP_2000227362_A_H.pdf,Aug. 2000.*
U.S. Appl. No. 17/413,128, filed Oct. 27, 2023_JP_2008249637_A_H.pdf, Oct. 2008.*
U.S. Appl. No. 17/413,128, filed Oct. 27, 2023_JP_2009072798_A_H.pdf,Oct. 2008.*
U.S. Appl. No. 17/413,128, filed Oct. 26, 2023_JP_4401590_B2_H.pdf,Jan. 2010.*
U.S. Appl. No. 17/413,128, filed Oct. 27, 2023_EP_1870218_A1_H.pdf, Dec. 2007.*
U.S. Appl. No. 17/413,128, filed Oct. 27, 2023_JP_2010023239_A_H.pdf,Feb. 2010.*
U.S. Appl. No. 17/413,128, filed Oct. 26, 2023_JP_S60245389_A_H.pdf,Dec. 1985.*
U.S. Appl. No. 17/413,128, filed Oct. 26, 2023_JP_2017514592_A_H.pdf,Jun. 2017.*
U.S. Appl. No. 17/413,128, filed Oct. 26, 2023_JP_H1063340_A_H.pdf,Mar. 1998.*
U.S. Appl. No. 17/413,128, filed Mar. 21, 2024_CN_215576310_U_H.pdf,Jan. 18, 2022.*
U.S. Appl. No. 17/413,128, filed Mar. 21, 2024_WO_2010009901_A2_H.pdf,Jan. 28, 2010.*
U.S. Appl. No. 17/413,128, filed Apr. 1, 2024_JP_2002321266_A_H.pdf,Nov. 5, 2002.*
U.S. Appl. No. 17/413,128, filed Apr. 10, 2024_CN_105678310_A_H.pdf,Jun. 15, 2016.*
U.S. Appl. No. 17/413,128, filed Apr. 10, 2024_CN_102621180_B_H.pdf,Aug. 1, 2012.*
U.S. Appl. No. 17/413,128, filed Apr. 11, 2024_JP_60245389_A_H.pdf,Dec. 5, 1985.*
U.S. Appl. No. 17/413,128, filed Apr. 11, 2024_WO_2008120774_A1_H.pdf,Oct. 9, 2008.*
U.S. Appl. No. 17/413,128, filed Apr. 11, 2024_EP_2799598_A1_H.pdf,Nov. 5, 2014.*
U.S. Appl. No. 17/413,128, filed Jul. 8, 2024_JP_2004514573_A_H.pdf,May 20, 2004.*
U.S. Appl. No. 17/413,128, filed Jul. 8, 2024_JP_2004530572_A_H.pdf,Oct. 7, 2004.*
U.S. Appl. No. 17/413,128, filed Jul. 8, 2024_JP_H06143297_A_H.pdf ,May 24, 1994.*
U.S. Appl. No. 17/413,128, filed Jul. 31, 2024_CN_102323332_A_H.pdf,Jan. 18, 2012.*
U.S. Appl. No. 17/413,128, filed Jul. 31, 2024_GB_2510654_A_I.pdf,Aug. 13, 2014.*
U.S. Appl. No. 17/413,128, filed Jul. 31, 2024_JP_2004325035_A_H.pdf,Nov. 18, 2004.*
Chen Zhaofeng, "Non-destructive Testing" Northwestern Polytechnical University Press, p. 147 (Jul. 2015).

* cited by examiner

CHECKING METHODS AND SYSTEMS FOR CHECKING A MECHANICAL PIECE MANUFACTURED BY USING A MOLD AND A MANUFACTURING PROCESS IN A FOUNDRY

TECHNICAL FIELD

The present invention relates to a checking method and a checking system for checking a mechanical piece made with a mold in a foundry. The present invention further relates to a checking method and a checking system for checking a manufacturing process that uses a mold in a foundry.

BACKGROUND ART

A station for manufacturing pieces in a foundry, or die casting machine, comprises at least one openable mold into which a predetermined quantity of molten metal is fed by gravity or by injection. The molten metal solidifies inside the mold and forms a die cast, that is to say a mechanical piece. The heat exchange between the molten metal that is solidifying and the internal surface of the mold is the factor that most affects the final quality of the mechanical pieces that are formed inside that mold. Normally, temperature controllers are embedded in the mold; they are controlled depending on the temperature measured by temperature sensors (typically thermocouples) to try to maintain the temperature of the walls of the mold equal to an optimal desired value. However, the action of the temperature controllers is relatively slow (i.e. it takes tens of seconds to cause significant variations in the surface temperature) and is not able to effectively compensate for changes in the surface temperature due to unexpected events (such as, in the case of high pressure die casting, a delay in the injection or a reduced injection rate) or to errors in the cooling and lubrication process (for example, a too long lubricant spraying that excessively cools the internal surface of the mold, or a non-homogeneous lubricant spraying that does not uniformly cool the internal surface of the mold).

In order to overcome the above described inconveniences infrared thermal cameras are used. They acquire thermographic images of the internal surfaces of the mold when the mold is open. Normally, a thermographic image of the internal surfaces of the mold immediately after the extraction of the mechanical piece that has just been formed and a thermographic image of the internal surfaces of the mold immediately before the closing of the mold (i.e. after the lubricant has been sprayed) are acquired. The thermographic images of the internal surfaces of the mold allow to monitor at each die casting process the temperatures of the areas of the mold of greatest interest and therefore allow to determine whether these temperatures are more or less close to the desired temperatures. In this way, operators can know with reasonable certainty if the die casting process is relatively stable or if events that do not allow to obtain the optimal temperature conditions of the internal surface of the mold have occurred.

Current solutions provide real-time temperature values of the most critical mold areas and thermographic images of the overall area framed by the thermal cameras. When the temperature of one or more monitored areas exceeds or is lower than the preset levels, the checking system alerts the operator that an anomalous condition has occurred and that it is necessary to intervene to analyze the anomaly and to adjust the temperature controllers accordingly.

In other words, thermographic processing systems are available on the market to determine thermal maps of the internal surfaces of the mold. Such thermal maps can be used to control the thermoregulation of the mold or the lubrication process. However, most of the analysis and processing of the thermographic images are performed subsequently by systems that process the thermal data in order to change the machine settings relating to the process or in order to schedule a preventive maintenance of molds and machine members.

The known thermographic processing systems analyze the thermographic images of the internal surface of a mold to obtain summary parameters or values (for example the minimum/maximum/average temperature of limited portions of the internal surface of the mold called "regions of interest") which are then used to regulate the temperature of the mold walls and/or to adjust other processes affecting the mold (such as, for example, the lubricant spraying on the internal surface of the mold before starting a new die casting process).

DISCLOSURE OF THE INVENTION

Object of the present invention is to provide a checking method and a checking system for checking a mechanical piece manufactured by using a mold in a foundry. Such method and system allow to improve the average quality of the mechanical pieces manufactured by die casting process and, at the same time, are easy and cheap to implement.

A further object of the present invention is to provide a checking method and a checking system for checking a manufacturing process that uses a mold (3) in a foundry. Such method and system allow to check the manufacturing process of mechanical pieces 2 by die casting in a more effective and more efficient way and, at the same time, are easy and cheap to implement.

The present invention provides checking methods and systems for checking a mechanical piece manufactured by using a mold and a manufacturing process in a foundry, as claimed by the appended claims.

The claims describe embodiments of the present invention and form an integral part of the present description.

BRIEF DESCRIPTION OF THE DRAWINGS

The present invention is now described with reference to the accompanying drawings, which illustrate a preferred embodiment to be understood as exemplary and non-limiting, wherein.

BEST MODE FOR CARRYING OUT THE INVENTION

Figure 1:
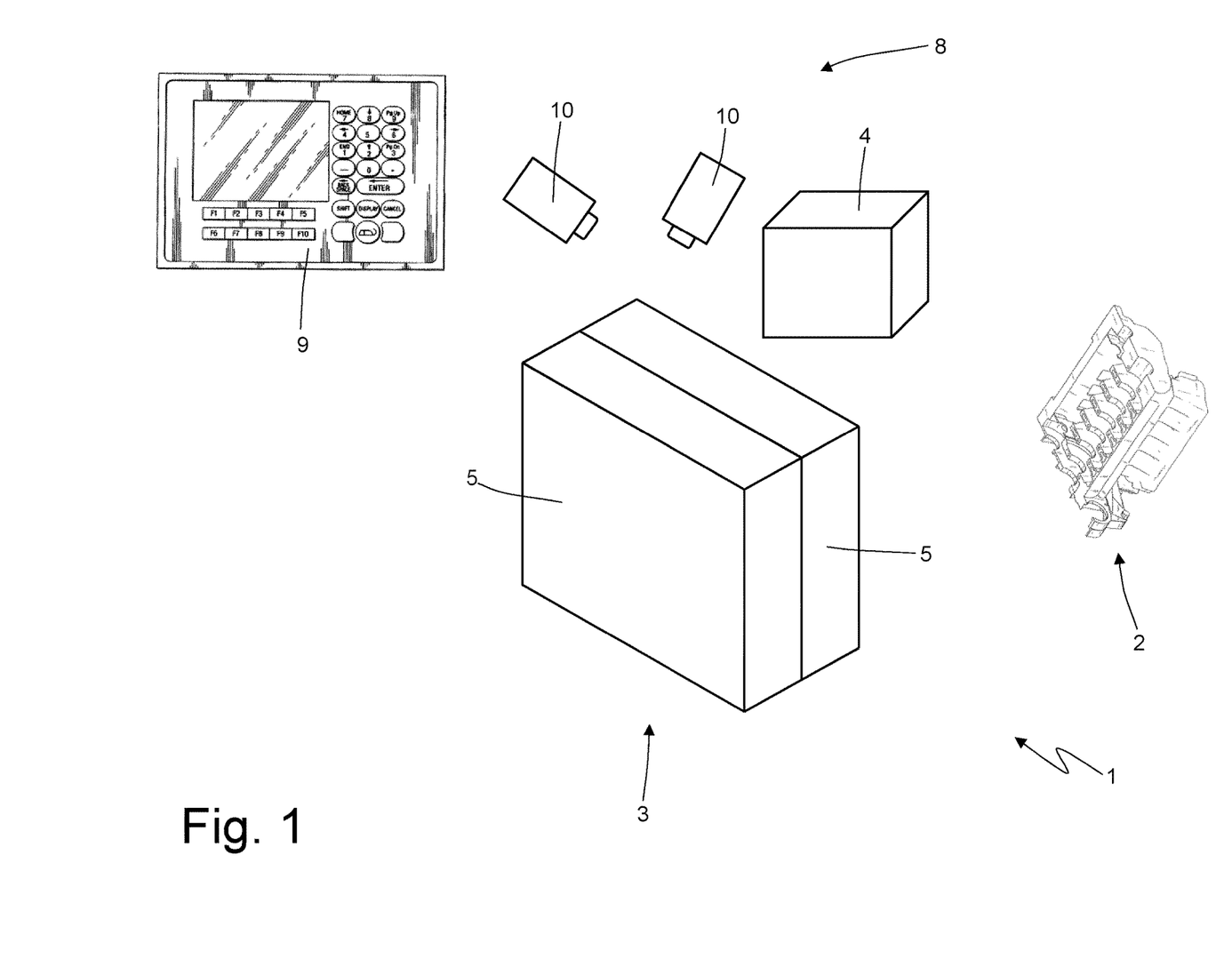
FIG. 1 is a schematic view of a station for manufacturing mechanical pieces in a foundry, or die casting machine, in which a mold is in a closed configuration.

A station, or die casting machine, for manufacturing mechanical pieces 2 in a foundry is shown in an extremely schematic way in FIG. 1 and is indicated as a whole with the reference number 1. The die casting machine 1, for example a HPDC (High Pressure Die Casting) machine enables the manufacture of mechanical pieces 2 in aluminum or other light alloys, such as cylinder heads or blocks for internal combustion engines.

The die casting machine 1 comprises an openable mold 3 (i.e. movable between a closed configuration shown in FIG. 1 and an open configuration shown in FIG. 2) and a feeding device 4 which is adapted to feed into the mold 3, in a per se known way through suitable openings not shown for the sake of simplicity, a predetermined amount of molten metal which solidifies inside the mold 3 and forms the mechanical piece 2.

In the embodiment illustrated in the attached figures, the mold 3 comprises two parts 5, at least one being movable to open and close the mold 3 (according to other embodiments not shown, the mold 3 comprises more than two parts); in particular at least one of the two parts 5 is connected to an actuator (of a known type, generally a hydraulic actuator) that is adapted to move that part 5. In other words, the mold 3 is composed of at least two parts 5 which can be coupled together (that is, they can be joined to each other to close the mold 3 as shown in FIG. 1) and which can be separated (that is, they can be moved apart from one another to open the mold 3 as shown in FIG. 2).

Figure 2:
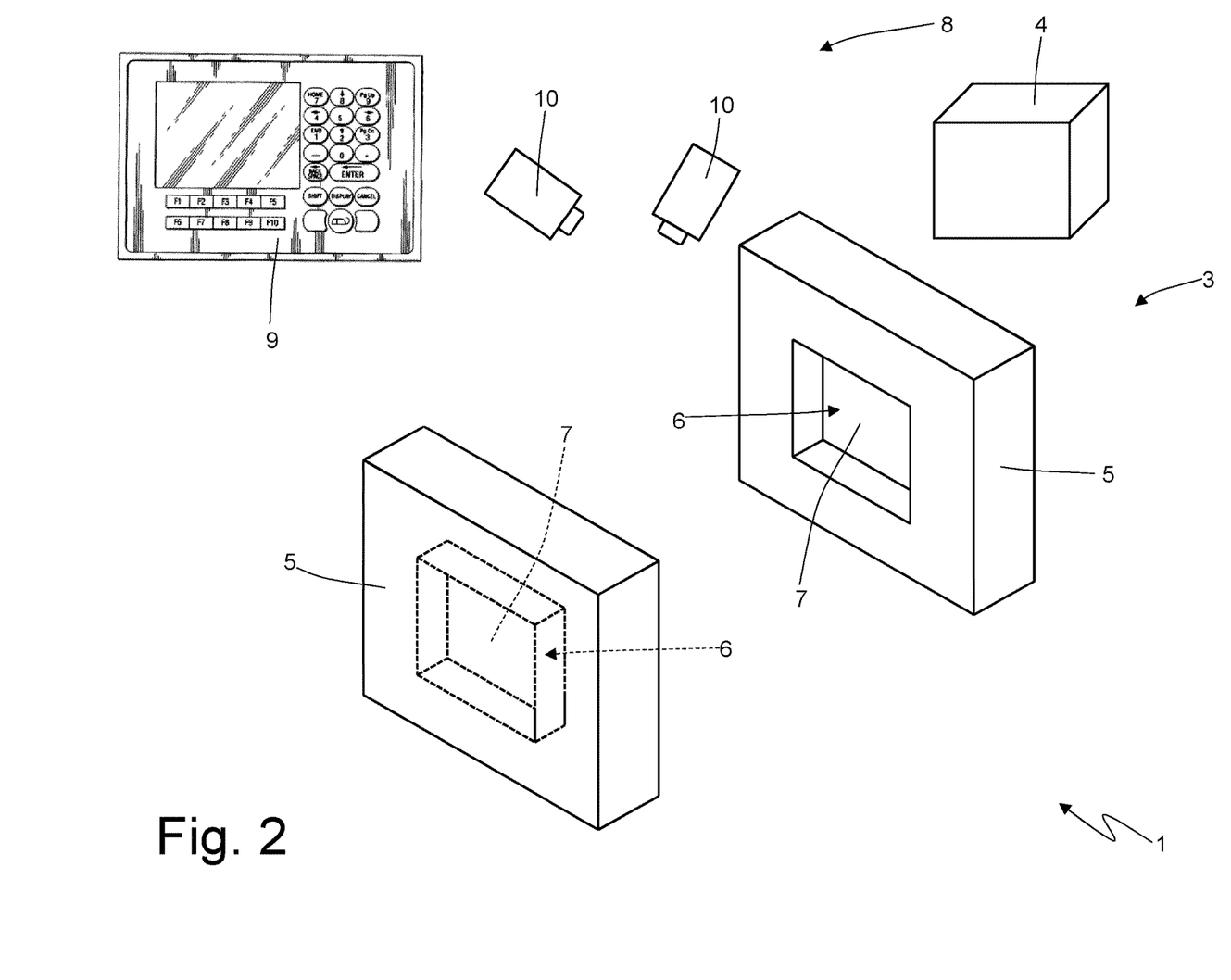
FIG. 2 is a schematic view of the station of FIG. 2, in which the mold is in an open configuration.

According to what is shown in FIG. 2, a hollow 6 s formed in each part 5 of the mold 3. When the mold 3 is in the closed configuration the hollows 6 of the parts 5 of the mold 3 define a cavity which has the negative shape of the mechanical piece 2. The feeding device 4 feeds the molten metal into the cavity 6. Each hollow 6 is delimited by an internal surface 7 which, in use, comes into contact with the molten metal which is fed by the feeding device 4.

Inside the mold 3, more specifically inside each part 5 of the mold 3, there are heaters (using for example gas burners) and coolers (using for example a coolant in a suitable circuit) which are adjustable for bringing to and maintaining the walls of the mold 3 at the desired temperature.

In use, the mold 3 is initially in the open configuration (shown in FIG. 2) and is subjected to a lubrication cycle during which nozzles, not shown in the figures, spray inside each hollow 6 and against the corresponding internal surface 7 a mixture of water serving to cool the internal surface 7 and a release agent which eases the detachment of the mechanical piece 2 from the internal surface 7 by counteracting the adherence of the mechanical piece 2 to the internal surface 7. When the preparation of the mold 3 has been completed, i.e. once the lubrication cycle has been completed, the mold 3 is closed, i.e. it moves from the open configuration (shown in FIG. 2) to assume the closed configuration (shown in FIG. 1). Cores (if any—generally disposable and made of pressed sand) are inserted into the mold 3 before the mold 3 is closed. A predetermined quantity of molten metal is fed into the closed mold 3, i.e. into the mold 3 when it is in the closed configuration shown in FIG. 1; in other words the molten metal is poured into the mold 3 to form the mechanical piece 2, also called die cast.

After having been fed into the mold 3, the molten metal is cooled down for a predetermined cooling time (for example 20-50 seconds) so that the mechanical piece 2 formed by the molten metal can solidify enough to be extracted from the mold 3 without damage. Once the cooling time is over, the mold 3 is opened, that is it moves from the closed configuration (shown in FIG. 1) to assume the open configuration (shown in FIG. 2), and then the newly formed mechanical piece 2 is extracted from the mold 3. Thus, the cycle starts again to manufacture a subsequent mechanical piece 2 and a new lubrication cycle takes place.

As shown in FIGS. 1 and 2, the die casting machine 1 comprises a checking system 8 with a processing unit 9 which supervises the operation of the entire die casting machine 1 and is preferably (but not necessarily) connected to a plurality of temperature sensors (e.g. thermocouples) that are embedded (inserted) in the walls of the mold 3. The temperature sensors measure in real time the temperature inside the walls of the mold 3, more specifically close to the internal surfaces 7 which directly contact the molten metal, and the measurements provided by the temperature sensors are used by the checking system 8 for controlling the heaters (using for example gas burners) or the coolers (using for example a coolant) so as to maintain the temperature of the walls of the mold 3 within a predetermined range.

The checking system 8 comprises a pair of thermal cameras 10 (or thermographic cameras) which are particular cameras sensitive to infrared radiation and therefore capable of obtaining thermographic images or shots; the thermal cameras cam 10 can be fixed focus cameras (normally used when the dimensions of the molds 3 are not very variable) or autofocus cameras (normally used when molds 3 of very different sizes can be installed in the die casting machine 1). The thermal cameras 10 are oriented towards the internal surfaces 7 of the two parts 5 of the mold 3 (or rather, of the respective hollows 6) when the mold 3 is open (as shown in FIG. 2). More specifically, each thermal camera 10 frames an internal surface 7 of a part 5 of the mold 3 when the mold 3 is open (as shown in FIG. 2). In this way, each thermal camera 10 is able to acquire a thermographic image of a corresponding internal surface 7, that is an image in which each pixel represents a measurement of the temperature of a corresponding area of the internal surface 7. According to alternative embodiments not shown, the checking system 8 comprises a different number of thermal cameras 10, from a minimum of a single thermal camera 10 to several (three, four, five, six, . . . ) thermal cameras 10, where each thermal camera frames a certain part 5 of the mold 3 or area of the internal surface 7 of the respective hollow 6.

The thermal condition of the internal surfaces 7 of the mold 3 is a critical factor for the quality of mechanical pieces 2 that are manufactured by die casting process. Information on the quality of the mechanical pieces 2 is obtained on the basis of the analysis of the thermographic images of the internal surfaces 7 of the mold 3.

A manufacturing process of a single mechanical piece 2 by using the mold 3 is described hereinafter, wherein the thermographic images of the internal surfaces 7 of the mold 3 acquired by the two thermal cameras 10 are used to determine the quality of the mechanical piece 2).

Initially, the mold 3 is open (as shown in FIG. 2), empty, and ready to form the mechanical piece 2. Immediately before closing the mold 3, that is with the least advance possible with respect to the instant of closing of the mold 3, the processing unit 9 acquires, through the two thermal cameras 10, at least a first real thermographic image (illustrated schematically in FIG. 3) of at least one internal surface 7 of the mold 3 which is in the open configuration. Normally, the two thermal cameras 10 each acquire a real thermographic image of a corresponding internal surface 7 of the mold 3.

After the processing unit 9 has acquired, through the two thermal cameras 10, at least one real thermographic image A of at least one internal surface 7 of the mold 3, the mold 3 is closed by mutually coupling the two parts 5 (as illustrated in FIG. 1). The feeding device 4 then feeds molten metal into the mold 3 which is in the closed configuration. At the end of a predetermined cooling time, the mold 3 is opened (as shown in FIG. 2) and the mechanical piece 2 formed by the solidified molten metal is extracted from the mold 3. Immediately after having removed the mechanical piece 2 from the mold 3 (that is, with the minimum delay possible with respect to the instant of extraction of the mechanical piece 2 from the mold 3), the processing unit 9 acquires, through the two thermal cameras 10, at least one second real thermographic image X (illustrated schematically in FIG. 6) of at least one internal surface 7 of the mold 3 which is in the open configuration. Normally, the two thermal cameras 10 each acquire a real thermographic image X of a corresponding internal surface 7 of the mold 3.

The processing unit 9 compares at least part of the real thermographic image A and/or related parameters (for example summary parameters described below) and at least part of the real thermographic image X and/or related parameters (for example summary parameters described below) with respective images and/or related parameters belonging to predetermined acceptability ranges, such ranges being determined theoretically or experimentally. In particular, according to a preferred embodiment, to compare the real thermographic image A and/or related parameters with images and/or related parameters belonging to the acceptability range, the real thermographic image A is compared with a corresponding reference thermographic image B by making a point by point comparison in at least one region of interest (R1-R3). Likewise, to compare the real thermographic image X and/or related parameters with images and/or related parameters belonging to the acceptability range, the real thermographic image X is compared with a corresponding reference thermographic image Y by making a point by point comparison in at least one region of interest (R1-R3). In this case an acceptability range can define the maximum acceptable difference between the real thermographic image A (or X) and the reference thermographic image B (or Y).

The processing unit 9 determines the presence of a possible anomaly in the mechanical piece 2 if the real thermographic image A is dissimilar from (i.e. it doesn't fall into) the corresponding acceptable range, that is if the real thermographic image A and/or related parameters do not correspond to an image and/or related parameters belonging to the corresponding acceptability range, and/or if the real thermographic image X is dissimilar from (i.e. it doesn't fall into) the corresponding acceptability range, that is if the real thermographic image X and/or related parameters do not correspond to an image and/or related parameters belonging to the corresponding acceptability range. According to a different embodiment, the processing unit 9 only compares the real thermographic image A and/or related parameters with images and/or related parameters belonging to the corresponding acceptability range, or compares only the real thermographic image X and/or related parameters with images and/or related parameters belonging to the corresponding acceptability range.

Figure 3:
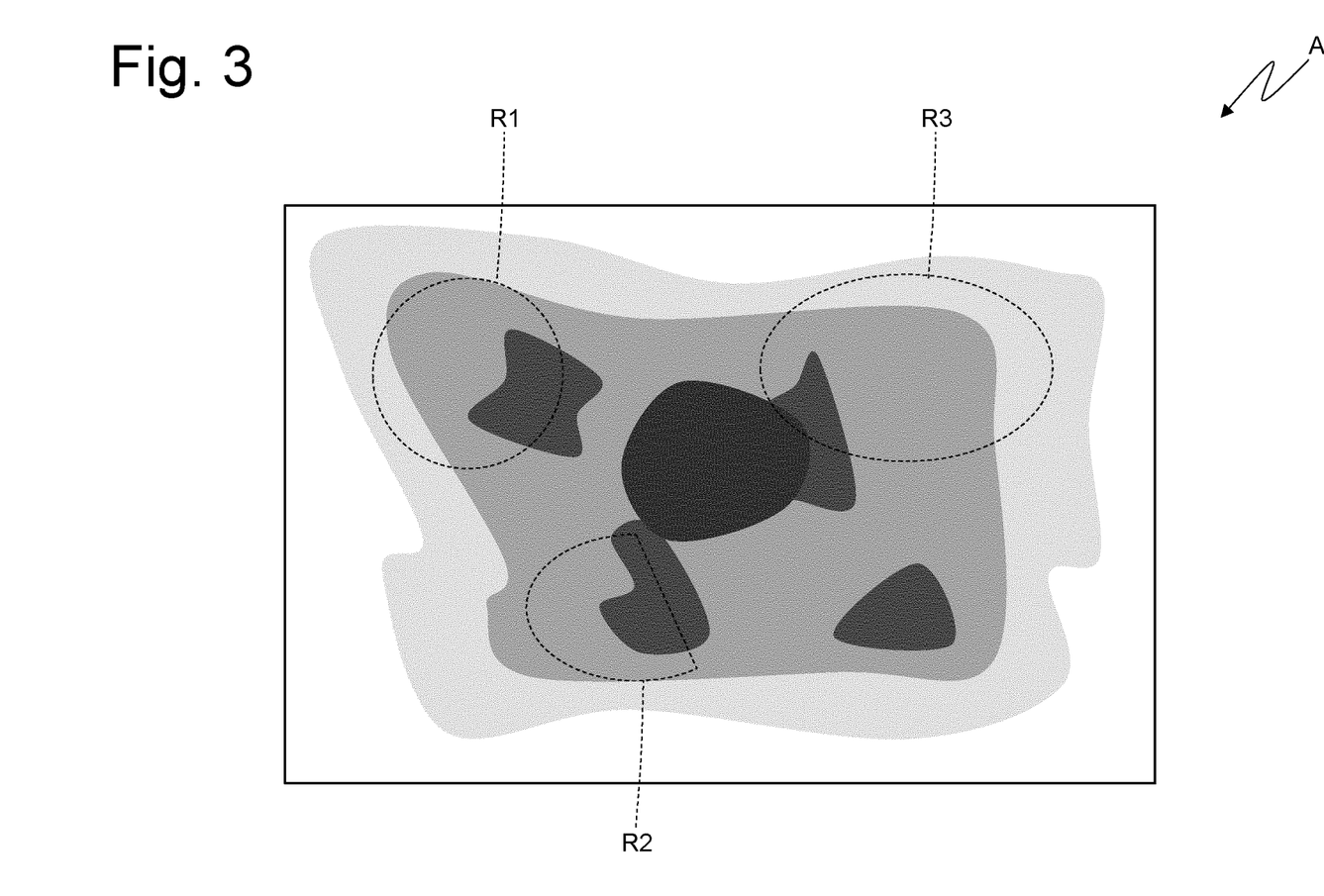
FIGS. 3-8 are respective schematic views of thermographic images of an internal surface of the mold of FIG. 2.
Figure 6:
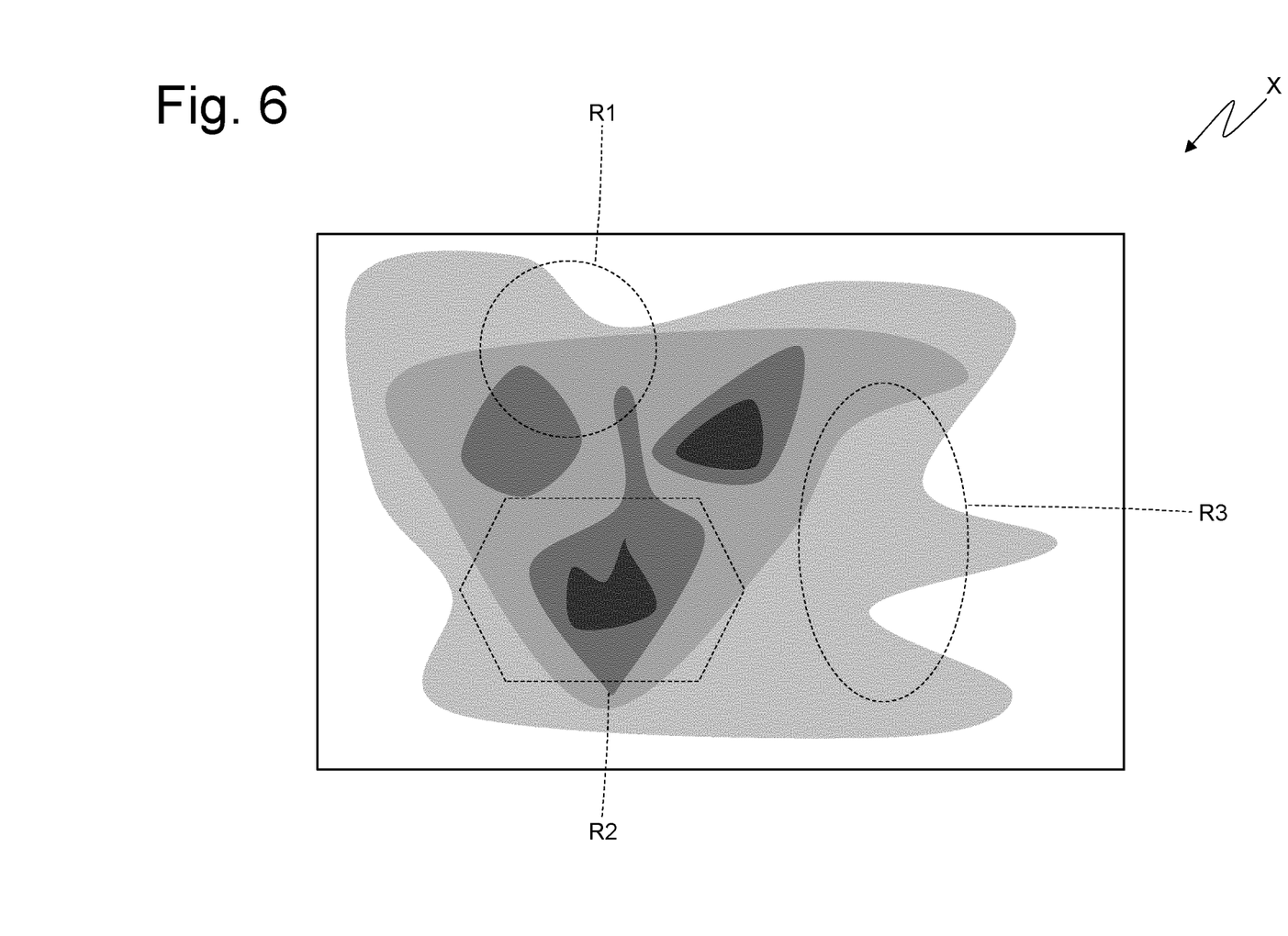

As shown in FIGS. 3 and 6, in the real thermographic images A and X the above mentioned regions of interest R1-R3 ("ROI—Region Of Interest") are identified. The regions of interest R1-R3 represent the most important areas of the internal surface 7 of the mold 3, that is the areas of the internal surfaces 7 of the mold 3 which mostly affect the manufacture of the mechanical piece 2. The analysis of the real thermographic images A and X focuses on the regions of interest R1-R3. More specifically, what is present inside the regions of interest R1-R3 has a greater weight than what is present outside the regions of interest R1-R3. Alternatively, what is present outside the regions of interest R1-R3 could even be completely ignored. The number, size, shape and arrangement of the regions of interest can completely vary from case to case.

According to a possible embodiment, the processing unit 9 determines in at least some areas (for example in the regions of interest R1-R3) of each real thermographic image A or X summary parameters or values (for example the minimum /maximum/average temperature of the regions of interest R1-R3 of the real thermographic image A or B) and compares these summary values obtained from the real thermographic image A or X with corresponding summary parameters or values belonging to the acceptability range to determine whether the thermographic image A or X conforms or not to the acceptability range. In other words, the processing unit 9 calculates summary parameters or values using the real thermographic image A or X and compares these summary parameters or values with corresponding parameters or values of the acceptability range: for example the average temperature of the region of interest R1 must be between 220° C. and 230° C., the maximum temperature of the region of interest R2 must be between 315° C. and 342° C., and the minimum temperature of the region R3 of interest must be between 180° C. and 196° C.

Figure 4:
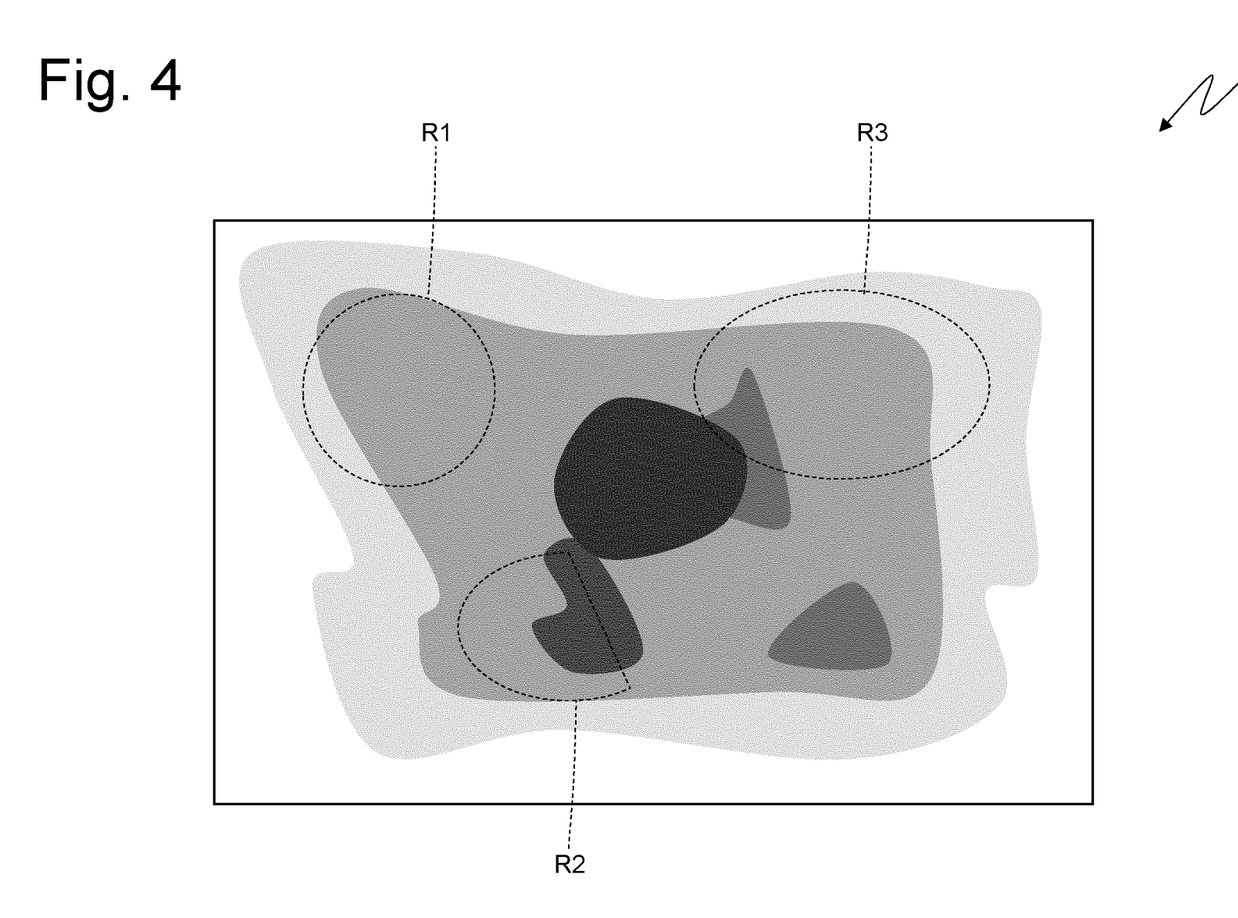
Figure 5:
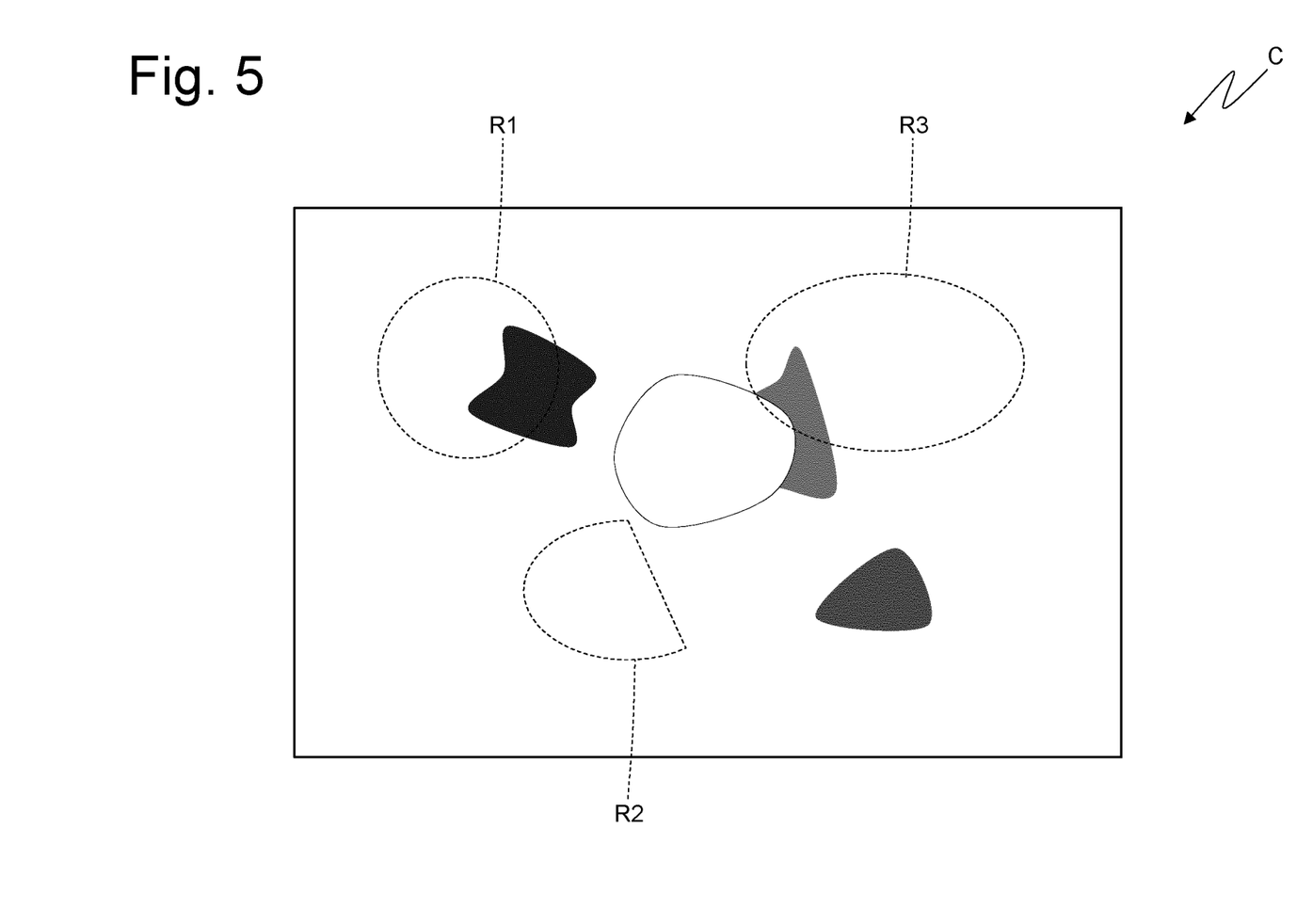
Figure 7:
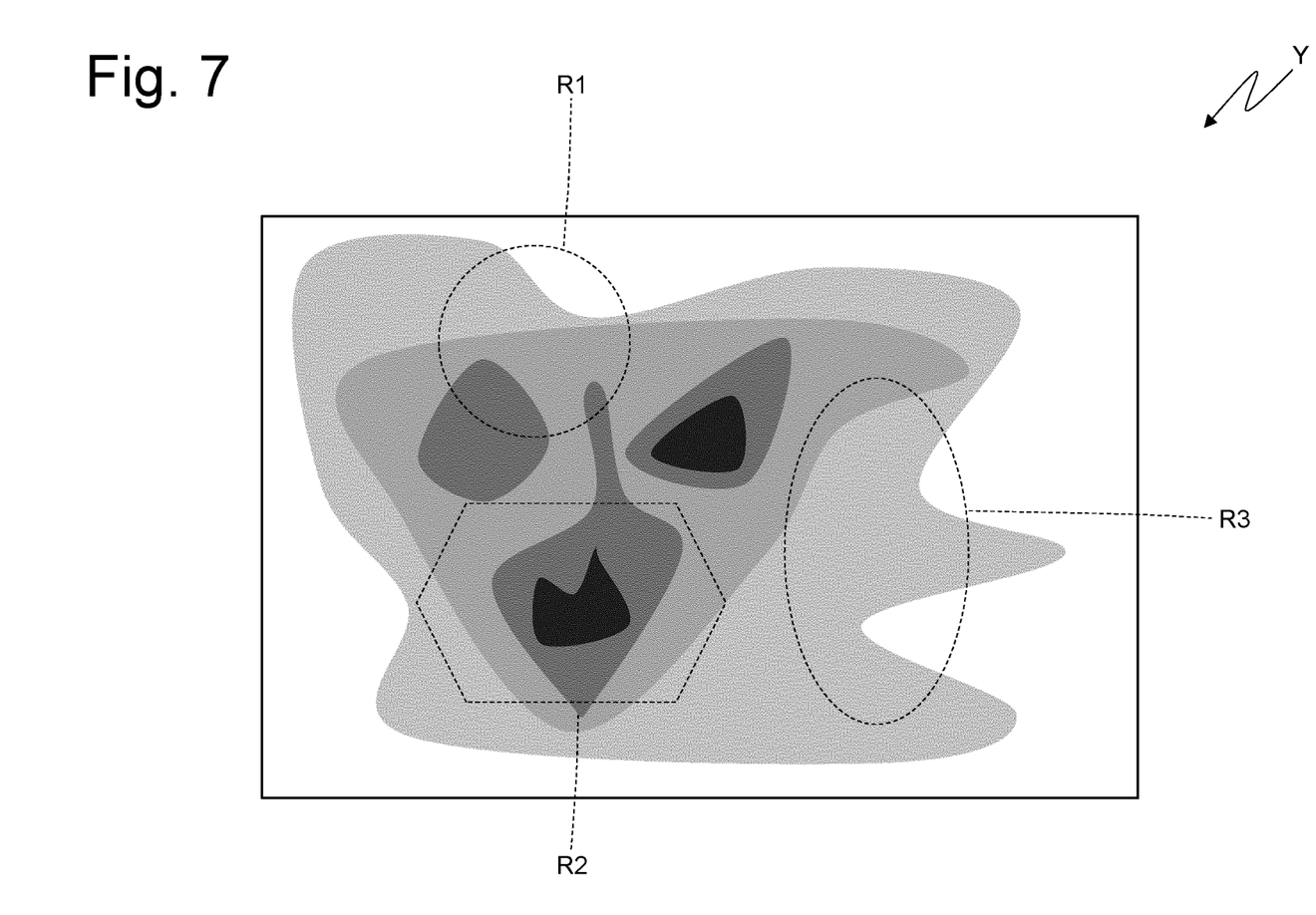
Figure 8:
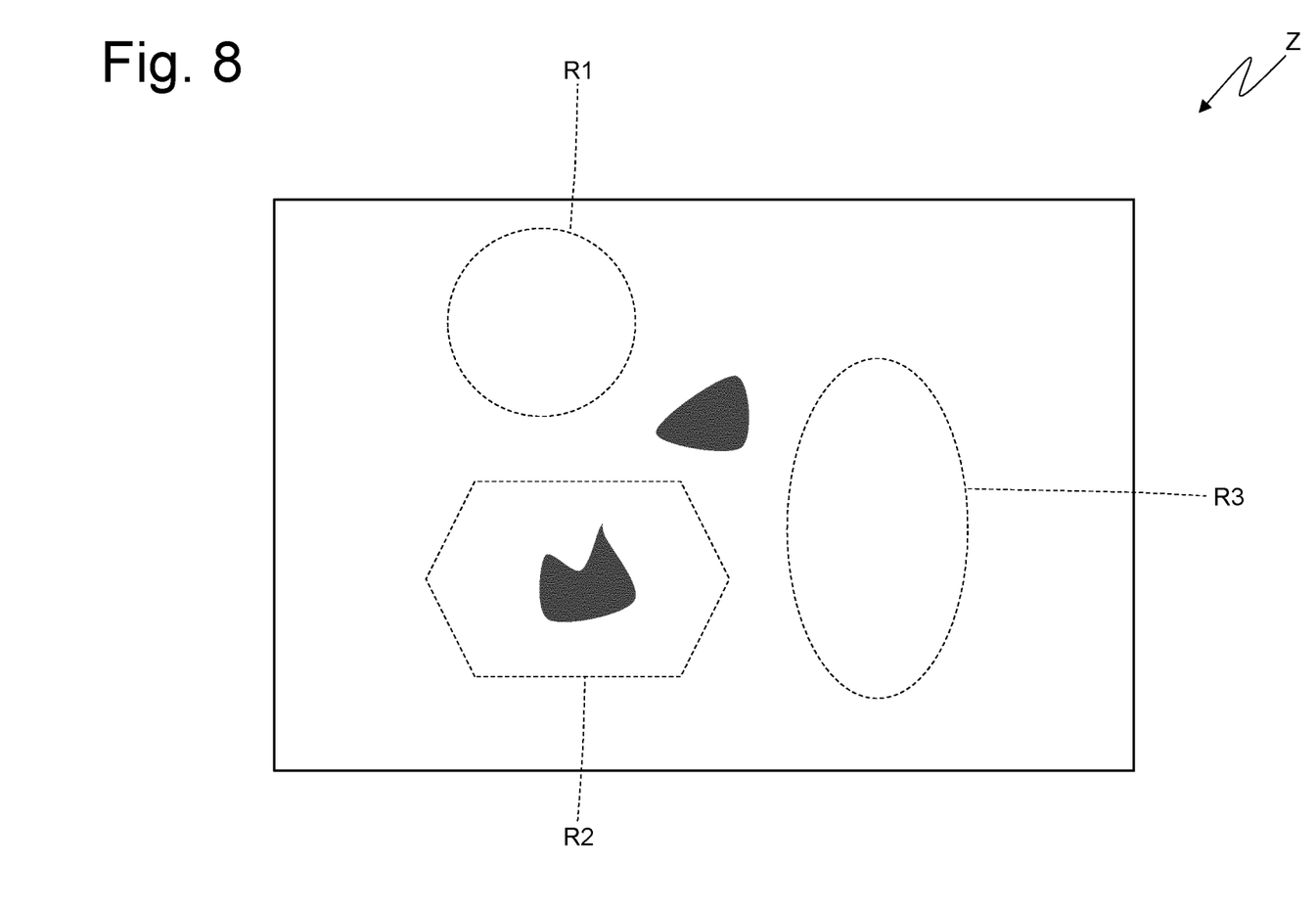

According to a different embodiment, the processing unit 9 compares the real thermographic image A and the real thermographic image X with the reference thermographic image B (illustrated schematically in FIG. 4) and with the reference thermographic image Y (illustrated schematically in FIG. 7) respectively, and determines a differential thermographic image C and a differential thermographic image Z (illustrated schematically in FIGS. 5 and 8) whose points have values equal to the differences between the values of the points of the real thermographic image A or X and the values of the corresponding points of the reference thermographic image B or Y. In other words, the value of each point of the real thermographic image A or X is subtracted from the value of the corresponding point of the reference thermographic image B or Y to determine the value of the corresponding point of the differential thermographic image C or Z. In this regard, is it is important to note that the value of a point of the thermographic images A, B, X, Y indicates the temperature corresponding to that point, while the value of a point of the differential thermographic images C and Z indicates the difference in temperature corresponding to that point.

In other words, the processing unit 9 can compare a real thermographic image A or X with a corresponding reference thermographic image B or Y by making a point by point comparison, that is by comparing each single point of the real thermographic image A or X with a corresponding point of the reference thermographic image B or Y. A high-definition thermal camera 10 currently on the market has for example a resolution of 640×512 pixels, that is, it is composed of 327,680 pixels. The comparison of a real thermographic image A or X with a corresponding reference thermographic image B or Y involves comparing the value of each of the 327,680 pixels of the real thermographic image A or X with the value of a corresponding pixel of the reference thermographic image B or Y.

Subsequently, the processing unit 9 determines in at least some areas (such as in the regions of interest R1-R3) of each differential thermographic image C or Z summary parameters or values (for example, the minimum/maximum/average temperature of the regions of interest R1-R3 of the differential thermographic image C or Z) and compares such summary parameters or values derived from the differential thermographic image C or Z with corresponding summary parameters or values synthesis of a variability range to determine whether the corresponding thermographic image A or X conforms to the acceptability range or it does not.

The variability range substantially represents a set of values which depart from the zero value by an acceptable quantity, wherein the zero value indicates the identity between the value of a point of the real thermographic image A or X and that of the corresponding point of the reference thermographic image B or Y. A real thermographic image A or X corresponds (that is, it is sufficiently similar) to a reference thermographic image B or Y if the differential thermographic image C or Z is sufficiently close to zero everywhere (and particularly in the regions of interest R1-R3).

The processing unit 9 verifies that a real thermographic image A or X corresponds (that is, is sufficiently similar) to a reference thermographic image B or Y by determining a differential thermographic image C or Z and verifying that the values of the thermographic image C or Z are sufficiently close to zero, that is are within the variability range. For example, the average differential temperature of the region of interest R1 must be between −10° C. and +8° C., the maximum differential temperature of the region of interest R2 must be between −19° C. and +21° C., and the minimum differential temperature of the region of interest R3 must be between −1° C. and +1° C.

According to a possible embodiment, to have a redundant check the processing unit 9 could use both the methods described above for verifying the conformity of a thermographic image A or X to the corresponding acceptability range.

According to a preferred embodiment, the processing unit 9 stores the real thermographic image A and/or the real thermographic image X and/or related parameters and/or anomalies as may be detected in a production report (typically in digital form) of the mechanical piece 2, that is a (digital) form containing the history of the manufacture of the mechanical piece 2.

If in the future defects appear in the mechanical piece 2 it could be possible to correlate the defects to undesired temperature deviations occurred during the manufacturing process of that mechanical piece 2.

If the real thermographic image A is significantly dissimilar from the corresponding acceptability range (that is the real thermographic image A falls significantly outside such range) and/or if the real thermographic image X is significantly dissimilar from the corresponding acceptability range (that is the real thermographic image X falls significantly outside such range), then the processing unit 9 can decide to isolate the mechanical piece 2 for a subsequent, additional quality control (aimed, for example, to verify the substantial absence of mechanical defects in the mechanical piece 2) or may even decide to discard the mechanical piece 2 directly. Generally, the processing unit 9 discards the mechanical piece 2 directly if the dissimilarity between the real thermographic image A and the corresponding acceptability range is greater than at least one first threshold and/or if the dissimilarity between the real thermographic image X and the corresponding acceptability range is greater than at least one second threshold. In other words, if the real thermographic image A is significantly dissimilar (but not too dissimilar) from the corresponding acceptability range and/or if the real thermographic image X is significantly dissimilar (but not too dissimilar) from the corresponding acceptability range, then the processing unit 9 generally decides to request a further quality control of the mechanical piece 2. Instead, if the real thermographic image A is very (too, having for instance exceeded the first threshold) dissimilar from the corresponding acceptability range and/or if the real thermographic image X is very (too, having for instance exceeded the second threshold) dissimilar from the corresponding acceptability range, the processing unit 9 generally decides to discard the mechanical piece 2.

The outcomes of the checks aimed to verify that at least part of the first real thermographic image A and/or related parameters correspond or not to images and/or related parameters belonging to a corresponding first acceptability range, and that at least part of the second real thermographic image X and/or related parameters correspond or not to images and/or related parameters belonging to a corresponding second acceptability range may be correlated with each other and/or combined with other dissimilarity checks of the real thermographic images A or X to determine the presence of possible anomalies in the mechanical pieces. For example, the second threshold relating to the second real thermographic image X can be defined or automatically changed as a result of the outcome of the dissimilarity check carried out to detect the dissimilarity of the first real thermographic image A with respect to the corresponding variability range; or in general the processing unit 9 can analyze in a coordinated manner all dissimilarities that could be detected between the first real thermographic image A and the second real thermographic image X and related acceptability ranges in order to determine possible anomalies in the mechanical piece 2. In other words, the determination of possible anomalies in the mechanical piece 2 and the resulting decision to discard that mechanical piece 2 are made not on the basis of the single comparisons between each of the first real thermographic image A and second real thermographic image X with the corresponding acceptability ranges but on the basis of a coordinated analysis.

According to a possible embodiment, a real thermographic image A or X is considered to be dissimilar (i.e. different) from a reference thermographic image B or Y if in at least one region the average of the values of the points of the corresponding differential thermographic image C or Z is greater than a third threshold.

According to a possible embodiment, the reference thermographic images B and Y are predetermined reference thermographic images obtained by means of a simulation of the manufacturing or forming process of a mechanical piece 2, that is they are created using mathematical models of the manufacturing or forming process of a mechanical piece. According to an alternative embodiment, the reference thermographic images B and Y are still predetermined reference thermographic images, but they are obtained by acquiring real thermographic images of an optimal manufacturing process, that is a process that took place in ideal conditions and proved to produce mechanical pieces 2 substantially free of defects. A plurality of real thermographic images are generally acquired and serve as the basis for calculating an average to obtain the reference thermographic images B and Y. It is also possible to combine the two methods by obtaining the reference thermographic images B and Y from real thermographic images of an optimal die casting process and then correcting (improving) the reference thermographic images B and Y on the basis of simulations of the die casting process. Alternatively, the reference thermographic images B and Y are obtained by simulating the die casting process, and are subsequently corrected (improved) on the basis of real thermographic images of an optimal die casting process.

The method according to the present invention provides that at least one part of the manufacturing process is checked using the differential thermographic image (C, Z) that has been determined.

Preferably, the differential thermographic image C or Z is displayed on a screen to be viewed by an operator of the die casting machine 1.

Moreover, according to a preferred embodiment, the differential thermographic image C or Z can be used by the processing unit 9 to perform the temperature regulation of the walls of the mold 3 and/or the adjustment of other processes acting on the mold 3 (such as, for example, the lubrication of the internal surfaces 7 of the mold 3 before starting a new die casting process). In particular, the processing unit 9 can apply to the differential thermographic image C or Z analysis processes to obtain summary parameters (for example, the difference in the minimum/maximum/average temperature of limited portions of the internal surfaces 7, that is of the regions of interest R1-R3) which are then used to regulate the temperature of the walls of the mold 3 and/or adjust other processes acting on the mold 3 (such as, for example, the lubrication of the internal surfaces 7 of the mold 3 before starting a new die casting process).

The above-mentioned method allows to check indirectly the quality of the mechanical pieces 2 manufactured by die casting process in order to isolate the mechanical pieces 2 that have been manufactured in non-optimal temperature conditions of the internal surfaces 7 of the mold 3. This new method of checking the quality of mechanical parts 2 does not exclude a final check of the mechanical pieces 2 carried out by sampling or by comprehensive investigations and employing the classic checking methods, such as visual, x-ray, dimensional, seal checking of the produced batches. The new method of checking the quality of mechanical pieces 2 enables to immediately isolate the mechanical pieces 2 manufactured in non-optimal conditions, particularly in the event of anomalies in the surface temperature of the mold 3.

In other words, if the real thermographic image A conforms to the corresponding acceptability range, the processing unit 9 assumes (with reasonable confidence) that the previous lubrication operation and the temperature regulation of the walls of the mold 3 have allowed the proper cooling of the internal surfaces 7 of the mold 3. In other words, the processing unit 9 has the confirmation (with reasonable confidence) that the manufacturing process of the mechanical piece 2 is under control and that there are no abnormal or warning conditions. Likewise, if the real thermographic image X conforms to the corresponding acceptability range, the processing unit 9 assumes (with reasonable confidence) that the manufacture of the mechanical piece 2 took place in optimal conditions; in other words, the processing unit 9 has the confirmation (with reasonable certainty) that the manufacturing process of the mechanical piece 2 took place under control, in the absence of abnormal or warning conditions.

The presence of anomalous conditions in the surface temperature of the mold 3 (i.e. the temperature of the internal surfaces 7 of the mold 3) in one of the two checking phases (immediately before closing the mold 3 and immediately after having removed the mechanical piece 2 from the mold 3) entails that the mechanical piece 2 which has been formed and is extracted must be isolated for further investigation and that a check of the thermoregulation parameters of the die casting machine must be carried out. The detected state of alert can remain active for at least one subsequent cycle even if the temperature of the internal surfaces 7 of the mold 3 prior to the closing of the mold 3 is within the preset parameters. The state of alert makes it possible to mark, if necessary, one or more mechanical pieces 2 manufactured with a process that has just come out of instability conditions.

The above described method for checking the quality of the mechanical pieces 2 and providing reports can be used on high and low pressure die casting machines, since it is based on checking the correspondence between the quality of a mechanical piece 2 and acceptable values of the thermal map of the internal surfaces 7 of the mold 3 or portions of it in the most appropriate process phases. The above described method for checking the quality of the die-cast mechanical pieces 2 and providing reports can also be used in the production of mechanical pieces manufactured by gravity die casting processes; in this case the thermal map of the internal surfaces 7 of the mold 3 can be automatically detected at the end of the heating of the mold 3, before the metal is poured into the mold 3 and/or after the mechanical piece 2 has been extracted from the mold 3.

It is important to underline that spraying lubrication is generally used only in high pressure die casting; it is not generally used in low pressure die casting and gravity die casting wherein the internal surface 7 of the mold can be heated by flame before closing the mold 3.

To summarize what is described above with reference to the high pressure die casting, both the first real thermographic image A—immediately before closing the mold 3—and the second real thermographic image X—immediately after the extraction of the mechanical piece 2 from the mold 3—are acquired, then a cooling and lubrication thermal treatment of the internal surface 7 of the mold 3 is carried out after the acquisition of the second real thermographic image X. In this case, the processing unit 9 checks that, at least in the regions of interest R1-R3, the values of the first real thermographic image A conform to the corresponding acceptability range (by using or not the differential thermographic image C), and that, at least in the regions of interest R1-R3, the values of the second real thermographic image X conform to the corresponding acceptability range (by using or not the differential thermographic image Z).

In case of low pressure die casting, only the real thermographic image A—immediately before closing the mold 3—or only the real thermographic image X—immediately after the extraction of the mechanical piece 2 from the mold 3—can be acquired if, as is generally the case, no cooling or heating thermal treatment of the internal surface 7 of the mold 3 is carried out. In this case the processing unit 9 checks that, at least in the regions of interest R1-R3, the values of the real thermographic image A or X conform to the corresponding acceptability range (by using or not the differential thermographic image C or Z).

In case of gravity die casting, both the real thermographic image A—immediately before closing the mold 3—and the real thermographic image X—immediately after the extraction of the mechanical piece 2 from the mold 3—can be acquired, and then a heating thermal treatment (by means of open flames) of the internal surface 7 of the mold 3 is carried out after the acquisition of the real thermographic image X. In this case the processing unit 9 verifies that, at least in the regions of interest R1-R3, the values of the real thermographic image A conform to the corresponding acceptability range (by using or not the differential thermographic image C) and that, at least in the regions of interest R1-R3, the values of the real thermographic image X conform to the corresponding acceptability range (by using or not the differential thermographic image Z).

A differential thermographic image can be used automatically by the processing unit 9, which, for instance, derives from the differential thermographic image the value of a control parameters, or manually by an operator, who on the basis of the displayed image can decide if and how to take action, in order to control the production process.

In addition to the comparisons previously mentioned between a real thermographic image A or X and a reference thermographic image B or Y (by using or not the differential thermographic image), more specifically between the real thermographic image A or X and/or related parameters and images and/or related parameters belonging to corresponding acceptability ranges, a method according to the invention may provide the comparison of a real thermographic image A with an immediately preceding real thermographic image X to evaluate the effectiveness of the heating or cooling thermal treatment of the internal surface 7 of the mold 3. In other words, in this case the reference thermographic image is a different real thermographic image A or X of the internal surface 7 of the mold 3 which has been acquired previously.

Another possible comparison which represents a phase of a method according to the present invention, for example to obtain a differential thermographic image, is the comparison between a real thermographic image A or X and a different real thermographic image A or X of a previous cycle (more or less distant in time), which has been acquired, for example, after the execution of a preceding thermal treatment in order to check the possible presence of thermal drifts over time (i.e. to check whether the internal surface 7 of the mold 3 is heating or cooling slowly).

The embodiments described herein can be combined with each other without departing from the scope of protection of the present invention.

The checking method described above provides several advantages.

Firstly, the checking method described above allows to improve the average quality of the mechanical pieces 2 that are manufactured by die casting process: the majority of the defects in the die casting, such as flaking, porosity, shrinkage and deposits is caused by or may be related to a non-perfect temperature distribution in the internal surfaces 7 of the mold 3 and the checking method described above makes it possible to ensure that during the manufacture of each mechanical piece 2 the temperature distribution in the internal surfaces 7 of the mold 3 (before the casting, that is immediately before closing the mold 3, and after the casting, that is immediately after having removed the mechanical piece 2 from the mold 3) is sufficiently similar to the optimal one.

The use of differential thermographic images C and Z makes it possible to better highlight any differences (even if not immediately apparent) between corresponding thermographic images, and therefore it allows to check the manufacturing process of mechanical pieces 2 by die casting in a more effective and more efficient way.

Moreover, the checking method described above does not lengthen the cycle times, since the acquisition of the real thermographic images A and X takes place completely automatically within fractions of a second.

Finally, in many cases the implementation of the checking method described above does not increase costs since the thermal cameras 10 are already normally provided in the die casting machine 1, for example to check the lubrication process, and therefore it is not needed to add any additional hardware.

The invention claimed is:

1. A method for checking a mechanical piece made with a mold in a foundry, the method comprising:
   acquiring at least one real thermographic image of an internal surface of the mold;
   comparing at least part of the at least one real thermographic image and/or parameters based on the at least part of the at least one real thermographic image with at least part of at least one reference thermographic image and/or parameters based on the at least part of the at least one reference thermographic image to determine a dissimilarity value;
   requesting further quality control of the mechanical piece when the dissimilarity value is outside of a first range; and
   deciding to discard the mechanical piece when the dissimilarity value is outside of a second range, wherein the second range is different from the first range.

2. The method of claim 1, further comprising storing the at least part of the at least one real thermographic image and/or the parameters based on the at least part of the at least one real thermographic image in a production report of the mechanical piece.

3. The method of claim 1, wherein the mold comprises at least two parts configured to be coupled and separated, the method further comprising:
   coupling the at least two parts for the mold to assume a closed configuration in which molten metal is poured into the mold; and
   opening the at least two parts for the mold to assume an open configuration in which the mechanical piece is extracted from the mold.

4. The method of claim 3, wherein the at least one real thermographic image is acquired before the mold is in the closed configuration.

5. The method of claim 3, wherein the at least one real thermographic image is acquired after the mold is in the open configuration.

6. The method of claim 1, wherein comparing the at least part of the at least one real thermographic image and/or the parameters based on the at least part of the at least one real thermographic image with the at least part of the at least one reference thermographic image and/or the parameters based on the at least part of the at least one reference thermographic image to determine the dissimilarity value comprises making a point-by-point comparison in at least one region of interest between the at least part of the at least one real thermographic image and the at least part of the at least one reference thermographic image.

7. The method of claim 1, wherein the first range is a maximum acceptable dissimilarity between the at least part of the at least one real thermographic image and/or the parameters based on the at least part of the at least one real thermographic image and the at least part of the at least one reference thermographic image and/or the parameters based on the at least part of the at least one reference thermographic image.

8. The method of claim 6, wherein comparing the at least part of the at least one real thermographic image and/or the parameters based on the at least part of the at least one real thermographic image with the at least part of the at least one reference thermographic image and/or the parameters based on the at least part of the at least one reference thermographic image to determine the dissimilarity value comprises determining a differential thermographic image with points having values equal to the differences between the values of the points of the at least one real thermographic image and the values of the corresponding points of the at least one reference thermographic image.

9. The method of claim 1, further comprising determining the at least one reference thermographic image by simulating a manufacturing process of the mechanical piece.

10. The method of claim 1, further comprising determining the at least one reference thermographic image by acquiring a plurality of real thermographic images of the internal surface of the mold that proved to be able to manufacture mechanical pieces substantially free of defects.

11. The method of claim 10, wherein determining the at least one reference thermographic image further comprises averaging the plurality of real thermographic images of mechanical pieces substantially free of defects.

12. The method of claim 1, further comprising cooling or heating the internal surface of the mold after acquiring the real thermographic image.

13. The method of claim 1, further comprising:
feeding molten metal into the mold; and
extracting the mechanical piece from the mold after a predetermined cooling time.

14. The method of claim 13, further comprising acquiring the at least one real thermographic image comprises:
acquiring a first real thermographic image before feeding the molten metal into the mold; and/or acquiring a second real thermographic image after extracting the mechanical piece from the mold.

15. The method of claim 1, wherein the second range is greater than the first range.

16. A system for checking a mechanical piece made with a mold in a foundry, the system comprising:
at least one thermal camera configured to acquire at least one real thermographic image of an internal surface of the mold when the mold is in an open configuration; and
a processing unit configured to:
comparing at least part of the at least one real thermographic image and/or parameters based on the at least part of the at least one real thermographic image with at least part of at least one reference thermographic image and/or parameters based on the at least part of the at least one reference thermographic image to determine a dissimilarity value;
requesting further quality control of the mechanical piece when the dissimilarity value is outside of a first range; and
deciding to discard the mechanical piece when the dissimilarity value is outside of a second range, wherein the second range is different from the first range.

17. The system of claim 16, wherein:
the mold comprises at least two parts configured to be coupled and separated, wherein each of the at least two parts has an internal surface; and
the system further comprises a feeding device configured to feed molten metal into the mold when the mold is in a closed configuration in which the at least two parts are coupled.

* * * * *